United States Patent [19]

Perry

[11] 4,368,553
[45] Jan. 18, 1983

[54] PORTABLE RAMP

[76] Inventor: H. Dwaine Perry, 5922 Yorkgate, Spring, Tex. 77373

[21] Appl. No.: 250,540

[22] Filed: Apr. 3, 1981

[51] Int. Cl.³ .............................................. E01D 1/00
[52] U.S. Cl. .................................................. 14/69.5
[58] Field of Search ........................ 14/69.5, 71.1, 72.5

[56] References Cited

U.S. PATENT DOCUMENTS

| | | | |
|---|---|---|---|
| 1,210,133 | 12/1916 | Baker | 14/69.5 |
| 1,821,734 | 9/1931 | Viche | 14/69.5 |
| 2,461,678 | 2/1949 | Christensen | 14/69.5 |
| 2,521,349 | 9/1950 | Diamond | 14/69.5 |
| 2,597,213 | 5/1952 | Whiteman | 14/72.5 |
| 2,629,120 | 2/1953 | Nelson | 14/69.5 |
| 2,760,216 | 8/1956 | Curtis | 14/72.5 |
| 3,315,292 | 4/1967 | Collins | 14/69.5 |
| 3,818,528 | 6/1974 | Petersen | 14/69.5 |
| 3,936,898 | 2/1976 | Poe | 14/69.5 |
| 3,984,891 | 10/1976 | Weinmann | 14/69.5 |

*Primary Examiner*—Nile C. Byers, Jr.
*Attorney, Agent, or Firm*—Guy E. Matthews

[57] ABSTRACT

A light weight portable ramp for permitting wheeled devices to be pulled over curbs and the like by one man, having a ramp surface angled to facilitate entry of the truck onto the ramp and an integral handle and stop member thereon for securely positioning the ramp with respect to the curb or the like.

5 Claims, 2 Drawing Figures

PORTABLE RAMP

BACKGROUND OF THE DISCLOSURE

The invention pertains to portable ramps particularly suited for permitting wheeled devices such as hand trucks and the like to be easily drawn over a curb by a single man.

In the prior art it is well known to use ramps to bridge differences in height so that wheeled vehicles may be easily moved to or from a higher or lower location. Examples of such ramps are shown in the following United States Patents: U.S. Pat. No. 3,984,891, Oct. 12, 1976 to Weinmann for a portable ramp having pivoted ends for adjustment to varying bridged heights; U.S. Pat. No. 3,936,898, Feb. 10, 1976 to Poe for a folding wheelchair ramp with pivotable legs and a handle; U.S. Pat. No. 3,818,528, June 25, 1974 to Petersen for a portable folding wheelchair ramp; U.S. Pat. No. 2,760,216, Aug. 28, 1956 to Curtis for a portable ramp having wheels and height adjustment; U.S. Pat. No. 2,597,213, May 20, 1952 to Whiteman for a movable ramp having wheels; U.S. Pat. No. 1,821,734, Sept. 1, 1931 to Viche for a curved toe board with projections thereon for preventing slipping; and U.S. Pat. No. 1,210,133, Dec. 26, 1916 to Baker for a trucking skid having a hinged curved lower end for engaging the wheels of a hand truck or the like.

Curbs, steps, and similar height obstructions are common problems for delivery men and others, who must pull heavily loaded hand trucks over these obstructions daily. Back and other injuries are not uncommon as these person are called upon to pull hand trucks loaded with approximately 250 pounds of, for example beverages, over typical eight inch curbs many times a day in the course of their business. In addition to physical injury, a substantial amount of work time and money is lost by employers as a result.

The special problems of these delivery persons, employees of soft drink and beer distributors and the similarly situated, are special and are not met by the prior art. In particular, the prior art has not provided a light weight ramp which is compact, easily carried by a single person and formed to permit a heavy truck to be easily pulled onto the ramp, while the ramp is securely positioned against the curb or other obstruction.

SUMMARY OF THE INVENTION

The present invention is directed to a portable ramp particular useful for the special needs of the route delivery person. The ramp of the invention is light weight, compact, and strong so that it may be easily carried and positioned by a single person, thereby encouraging the use of the ramp by the delivery-man. The ramp surface is specially curved to accommodate the wheels of a truck and securely engage the curb without slipping.

It is therefore an object of the invention to provide an improved portable ramp which is easily carried and positioned by one person, to encourage its continuing use throughout a work day.

It is a further object of the invention to provide such a portable ramp formed to securely engage a curb or other obstruction and upon which a heavily loaded hand truck, or the like may be pulled without dislodging or moving the ramp.

Many other advantages, features, and objects of the present invention will appear to one skilled in the art upon review of the following detailed description and drawings.

BRIEF DESCRIPTIONS OF THE DRAWINGS

DESCRIPTION OF THE PREFERRED EMBODIMENT

Figure 2:
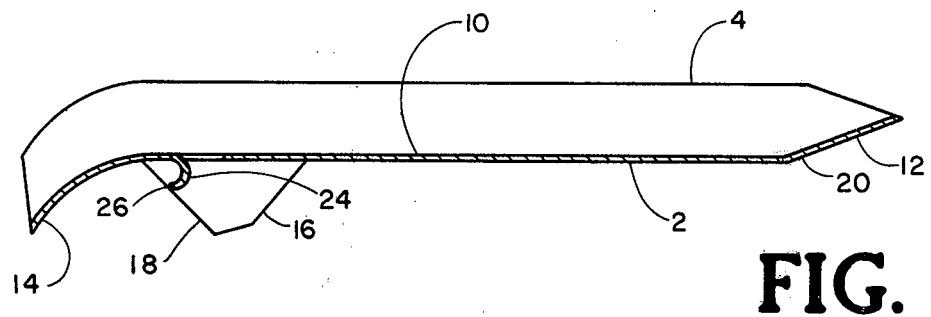
FIG. 2 is a cross-sectional view along line 2—2 of FIG. 1.
Figure 1:
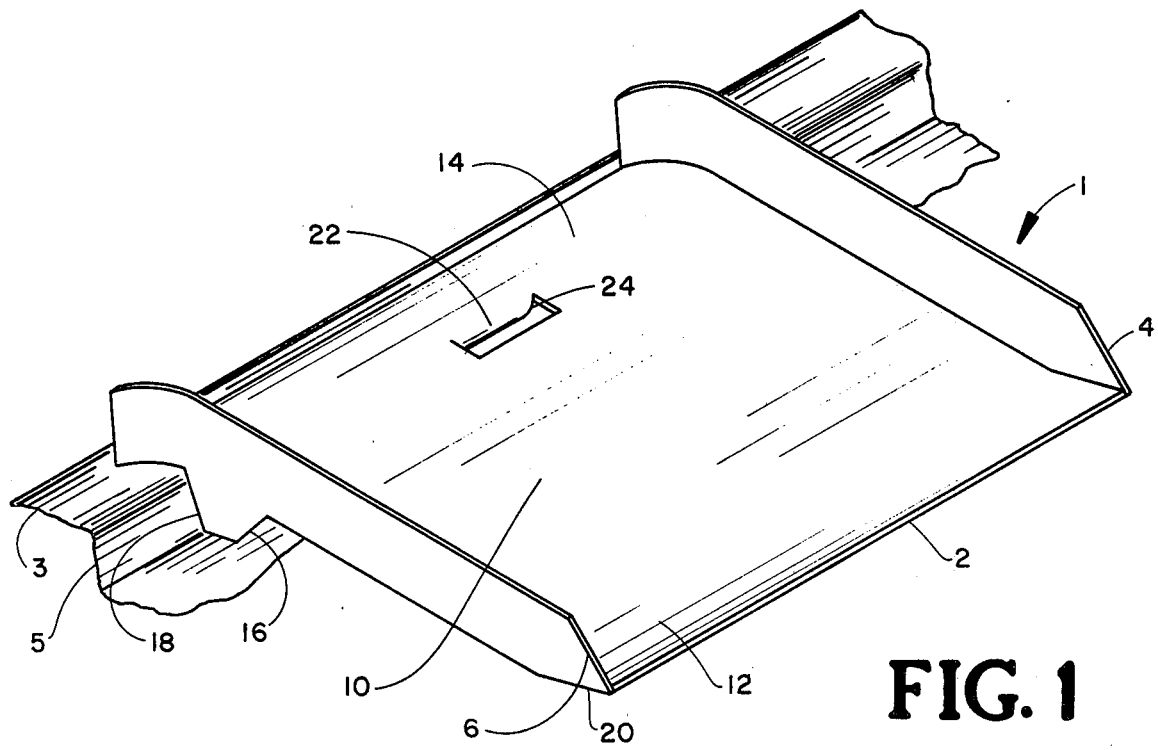
FIG. 1 is a perspective view of the ramp of the invention.

The portable ramp of the invention is illustrated generally in FIG. 1 at 1. The ramp includes a support surface 2, preferably formed of metal plate, a first side plate 4 and a second side plate 6. As best seen in FIG. 2, the bottom edges 8 of the side plates are preferably contoured like the support surface 2, and are attached thereto by welding or other means. The side plates 4, 6 add strength and bending resistance to the plate 2. The width of the ramp plate is preferably approximately 24 inches so that the ramp may be used with typical hand trucks. The weight of a hand truck is transmitted to the ramp through its spaced apart wheels and it is apparent that the side plates 4, 6 strenghten the curved plate 2 where the wheels will ride and the load is the greatest.

The support surface 2 is preferably checkered plate to provide a non-slip surface and additional strength and bending resistance. The ramp may be constructed of any suitable material, however, it has been found that ⅛ inch thick checkered steel plate provides a light weight ramp in accordance with the invention. The support surface 2 includes a first generally flat surface 10, an angled lower end 12 and an oppositely angled upper end 14. The configuration of the support 2, which may be generally described as an S, permits easy transition of the wheels of a hand truck from the street onto the lower portion 12 of the ramp, up the inclined flat portion 10 and over the upper portion 14 over the curb 3.

The side plates 4, 6 are identical and include a depending arm 16, best seen in FIG. 1. A straight section 18 of the depending arm 16 abuts the curb in use and prevents movement of the ramp 1 toward the curb when a heavily loaded hand truck is pulled onto the ramp. The side plates include at their lower end a surface 20, which is preferably in generally parallel contact with the street or lower surface level when the ramp is positioned on a curb 3 for use.

Another feature of the ramp of the invention is the handle 22, which is preferably formed by making a U shaped cut in the ramp plate 2 at its approximate center and bending the resulting tab 24 inwardly. As best seen in FIG. 2, the tab 24 is preferably bent forward so that its forward edge 26 at least intersects the imaginery plane defined by the surfaces 18 on the end plates 4,6. Positioning the forward edge 26 of the tab 24 in this manner causes it to function as a stop member to prevent forward movement of the ramp. When the ramp is positioned on the curb the edge 26 of the stop member 24 will be positioned to abut the vertical wall 5 of the curb. It is apparent that the length and position of the tab 24 may be varied by choosing the size of the cut made in the ramp plate and the angle of bending the tab 24. A handle having a smooth curve is therefore provided to ease one handed carrying of the ramp. The stop member defined by the tab 24 is an additional safety feature in that it will prevent the ramp from moving up a curb if the surfaces 18 be located on a curved surface or if the ramp is used on a low curb or obstruction. The tab 24 provides no bearing or sliding surfaces such as the surfaces 18 may in such conditions and effectively prevents upward movement of the ramp.

As best seen in FIG. 2, the angle between the surfaces 18 and the upper end 14 of the support surface is a load bearing angle. Both the upper end 14 and the surfaces 18 abut the curb and support the ramp in use and the depending arms 16 additionally resist bending of the support surface.

In use, the ramp may be carried with one hand to the curb and placed on it such that the upper end 14 is on or over the curb and the surfaces 18 of the end plates are against the curb. When so positioned the angled section 8 of the ramp is parallel to ground level to permit the truck to be easily pulled onto the ramp. The transition from the angled section 8 to the flat incline section 10 is smooth and allows the truck to ride easily over the curb. After use, the ramp is easily returned to its normal storage location on the delivery truck. The ramp is light and easy to handle so that workers are easily encouraged to use the ramp throughout the day and thereby the chance or opportunity of injury through moving heavy loads is substantially decreased.

It is apparent that the ramp as presented may be sized and configured so as best to overcome the height differences and obstacles present in any industry, however, it has been found that a ramp suitable for use by route deliverymen of soft drinks, beer, and the like, preferably calls for a ramp in accordance with the invention approximately 24 inches wide and 23½ inches in length. The curbs encountered by this class of workman generally range from 6 to 8 inches in height and a ramp for this purpose includes a flat support surface 10 approximately 15 inches in length, a generally flat lower portion 12 approximately 3 inches in length and angled upwardly with respect to the flat portion 10 at approximately 15°, and a curved upper portion 14 curving approximately 2½ inches downwardly from the plane of the flat portion 10. Finally, the surfaces 18 preferably extend from a point approximately 2 inches below the flat section 10 of the ramp, upperwardly at an angle of approximately 45° relative to the plane formed by the flat section 12, to a point adjacent the curved upper section of the ramp surface.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to their features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable ramp for placement adjacent a curb having a wall extending down to a street or the like for use with portable, wheeled devices for carrying goods comprising:
   (a) ramp means including:
      a support surface for supporting and enabling movement or the wheeled devices on the ramp, said support surface including a lower end for placement on the street; and
      said support surface further including an upper end for placement on the curb.
      said support surface also including a stop member extending downwardly therefrom adjacent said upper end, said stop member contacting the curb to prevent unwanted movement of the ramp as the wheeled devices are moved upwardly over the curb from said lower end to said upper end to enable goods to be carried;
   (b) two longitudinal side plates mounted with the support surface, each of said side plates including a load bearing section for placement on the curb; and
   (c) a pair of depending arms, one of each of which is mounted with said support surfaces adjacent one of each of said longitudinal side plates, said arm being mounted adjacent said upper end and extending downwardly to contact the wall of the curb wherein the angle between each of said depending arms contacting the wall of the curb and one of each of said load bearing sections of one of each of said side plates, respectively, is a load bearing angle to help support said wheeled devices.

2. The ramp as set forth in claim 1, wherein the plate has an extended cut therethrough defining an integral stop member tab on the plate, the tab being bendable to position the stop member and define a handle opening in the plate.

3. The ramp as set forth in claims 1 or 2, wherein the lower end of the support surface is angled upwardly for generally horizontal engagement with the street.

4. The ramp as set forth in claim 1, wherein the upper end of the support surface is angled downwardly for engagement over the curb.

5. A method of manufacturing a ramp for placement adjacent a curb or the like comprising the steps of:
   providing a support surface;
   cutting through said support surface to define a tab on the support surface; and
   bending the tab downwardly with respect to the support surface to abuttingly engage the wall of the curb when the ramp is adjacent the curb, thereby defining an opening through the plate.

* * * * *